United States Patent
Tomita et al.

[11] Patent Number: 6,039,071
[45] Date of Patent: Mar. 21, 2000

[54] VALVE SEAL MECHANISM

[75] Inventors: Taku Tomita, Tokyo; Mitsutoshi Araki; Naoyuki Yasuda, both of Ibaraki-ken, all of Japan

[73] Assignee: SMC Kabushiki Kaisha, Tokyo, Japan

[21] Appl. No.: 09/085,230

[22] Filed: May 27, 1998

[30] Foreign Application Priority Data

May 27, 1997 [JP] Japan .................................. 9-137208

[51] Int. Cl.[7] .................................................. G05D 16/02
[52] U.S. Cl. ............... 137/505.37; 137/505; 137/596.17; 251/333
[58] Field of Search ............... 137/505.37, 505, 137/596.17; 251/333, 359, 364

[56] References Cited

U.S. PATENT DOCUMENTS

| | | | |
|---|---|---|---|
| 2,621,011 | 12/1952 | Smith | 251/359 |
| 2,695,032 | 11/1954 | Kmieck | 251/333 |
| 2,904,072 | 9/1959 | Palen | 251/333 |
| 4,249,717 | 2/1981 | Thompson | 251/333 |
| 5,452,741 | 9/1995 | Tomita et al. | |

FOREIGN PATENT DOCUMENTS

1 441 295  6/1976  United Kingdom .

*Primary Examiner*—Stephen Hepperle
*Attorney, Agent, or Firm*—Oblon, Spivak, McClelland, Maier & Neustadt, P.C.

[57] ABSTRACT

When a valve body of a pressure-reducing valve is displaced in the direction indicated by the arrow B, a seal pad of a valve seal mechanism on the valve body abuts against a ridge on a seat, which enters the seal pad to provide a seal therebetween. When the ridge enters the seal pad by a distance, abutment surfaces of holders on the seat are held against the seal pad, preventing the ridge from entering the seal pad beyond the distance. The distance by which the ridge enters the seal pad is thus made constant. The ridge is spaced from the abutment surfaces by a groove, which communicates with a primary port through grooves between the holders, keeping a constant valve sealing area. The pressure-reducing valve which incorporates the valve seal mechanism has a constant quality level.

10 Claims, 7 Drawing Sheets

ND DESCRIPTION OF THE INVENTION TEXT BEGINS>

VALVE SEAL MECHANISM

BACKGROUND OF THE INVENTION

1. Field of the Invention

The present invention relates to a valve seal mechanism for providing a seal between two ports of a fluid pressure device when fluid communication between the ports is cut off.

2. Description of the Related Art

Heretofore, valve seal mechanisms are used in fluid pressure devices such as pressure-reducing valves or the like.

Figure 7:
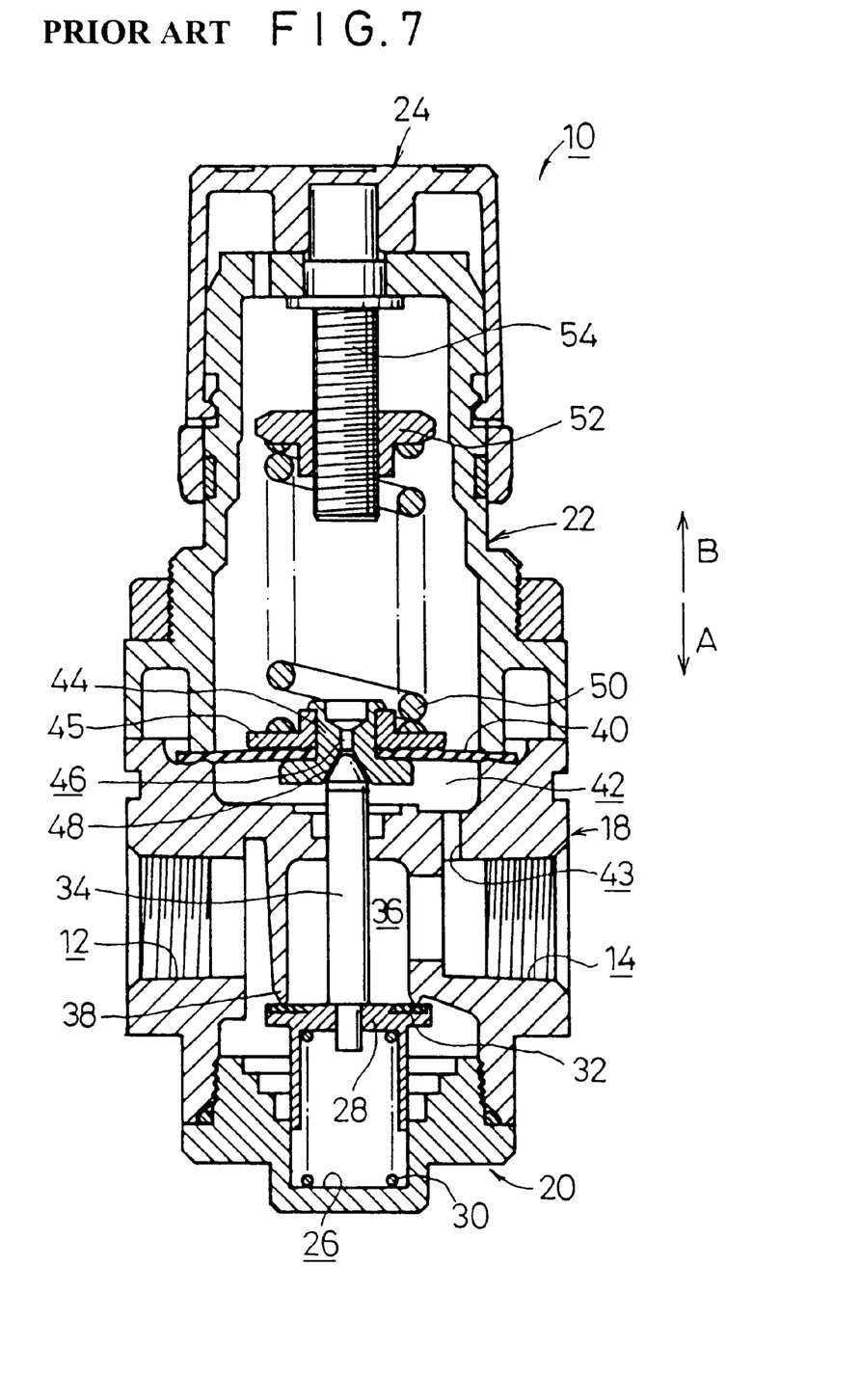
FIG. 7 is a longitudinal cross-sectional view of a pressure-reducing valve which incorporates a conventional valve seal mechanism.

FIG. 7 of the accompanying drawings shows a pressure-reducing valve 10 which incorporates a conventional valve seal mechanism. The pressure-reducing valve 10 comprises a valve housing 18 having primary and secondary ports 12, 14 defined therein, a bonnet 22 mounted on an upper end of the valve housing 18, and a handle 24 rotatably supported on an upper end of the bonnet 22.

A valve guide 20 is fitted in a lower end of the valve housing 18 and has a recess 26 in which a valve body 28 is slidably inserted. The valve body 28 is resiliently supported on the valve guide 20 by a helical spring 30. A ring-shaped seal pad 32 of a resilient material is disposed on an upper end of the valve body 28. The valve body 28 supports thereon a rod-shaped stem 34 fixed centrally to the upper end thereof. The stem 34 has a tapered upper end.

Figure 8:
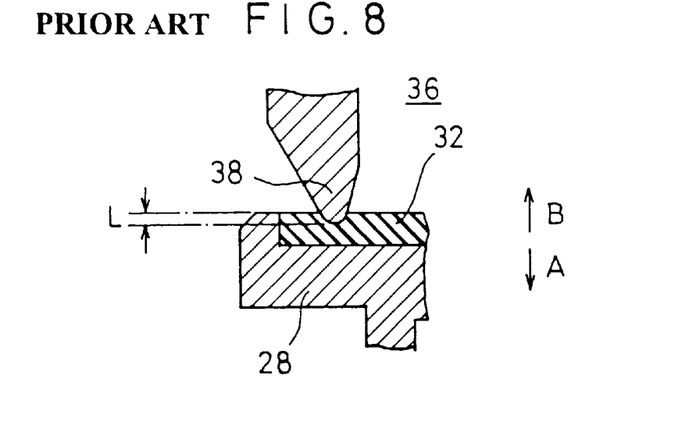
FIG. 8 is an enlarged fragmentary cross-sectional view of the valve seal mechanism in the pressure-reducing valve shown in FIG. 7.

The valve housing 18 has a chamber 36 defined therein in communication with the secondary port 14, and the stem 34 extends through the chamber 36. The chamber 36 is defined by a substantially cylindrical wall whose lower end has a seat 38 engageable with the seal pad 32. As shown in FIG. 8 of the accompanying drawings, the seat 38 has an outer wall surface tapered radially inwardly in the direction indicated by the arrow A and an inner wall surface, which defines the chamber 36, tapered radially outwardly in the direction indicated by the arrow A. Therefore, the seat 38 is progressively thinner toward its lower tip end.

As shown in FIG. 7, a diaphragm 40 is clamped between the valve housing 18 and the bonnet 22, and the diaphragm 40 and a recess defined in the upper end of the valve housing 18 jointly define a diaphragm chamber 42 which communicates with the secondary port 14 through a passage 43. A diaphragm holder 44 is mounted centrally on the diaphragm 40 and has a central through hole 46 defined therein. The central through hole 46 includes a downwardly spreading tapered hole 48 which is closed by the tapered upper end of the stem 34.

A spring seat 45 is mounted on an upper surface of the diaphragm 40 around the diaphragm holder 44. A pressure regulating spring 50 has a lower end seated on the spring seat 45 and an upper end seated on a nut 52 threaded over a screw 54 fixed to the handle 24. When the handle 24 is turned, the nut 52 is axially displaced in the direction indicated by the arrow A or B.

When the pressure of a fluid in the secondary port 14 of the pressure-reducing valve 10 is kept at a preset pressure $P_2$, the tip end of the seat 38 enters and elastically deforms the seal pad 32, providing a seal between the seat 38 and the seal pad 32 (see FIG. 8). Therefore, the primary and secondary ports 12, 14 are disconnected from each other. It is assumed that the tip end of the seat 38 enters the seal pad 32 by a distance L.

Figure 9:
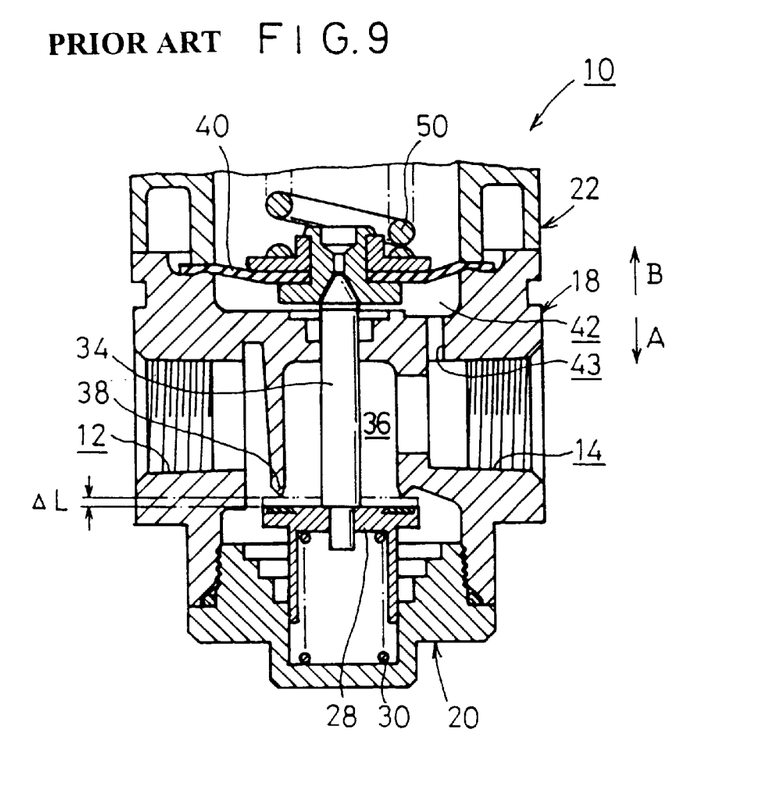
FIG. 9 is a fragmentary cross-sectional view showing the manner in which the pressure-reducing valve shown in FIG. 7 operates.

When the fluid pressure in the secondary port 14 drops from the pressure $P_2$ by $\Delta P$, the pressure in the diaphragm chamber 42 drops, displacing the diaphragm 40 in the direction indicated by the arrow A shown in FIG. 9 of the accompanying drawings. The stem 34 and hence the valve body 28 are displaced a distance $\Delta L$ in the direction indicated by the arrow A against the bias of the helical spring 30, whereupon the primary port 12 communicates with the chamber 36, allowing the fluid to flow from the primary port 12 to the secondary port 14.

When the fluid pressure in the secondary port 14 increases to the pressure $P_2$, the pressure in the diaphragm chamber 42 builds up, displacing the diaphragm 40 in the direction indicated by the arrow B. The seat 45 rises, and the stem 34 is displaced in the direction indicated by the arrow B. As a result, as shown in FIG. 8, the seal pad 32 is held against the seat 38, which enters and elastically deforms the seal pad 32, thereby disconnecting the primary and secondary ports 12, 14 from each other.

The distance L by which the seat 38 enters the seal pad 32 varies depending on various elements including the hardness of the seal pad 32, the load on the helical spring 30 (the force applied to the helical spring 30 when the seal pad 32 is held against the seat 38), and the finished configuration of the seat 38. If the distance L varies, the drop $\Delta P$ in the pressure in the secondary port 14 which is required for the seat 38 to be spaced from the seal pad 32 also varies, resulting in a change in the rate of the fluid flowing in the pressure-reducing valve 10 varies. When a plurality of pressure-reducing valves 10 are manufactured, it is difficult to keep them at a constant quality level. Accordingly, it is also difficult to keep fluid pressure systems which incorporate such pressure-reducing valves 10 at a constant quality level.

SUMMARY OF THE INVENTION

It is a general object of the present invention to provide a valve seal mechanism in which a ridge on a seat enters a seal pad to provide a seal for thereby disconnecting two ports from each other, and abutment surfaces of holders on the seat abut against the seal pad to cause the ridge to enter the seal pad by a substantially constant distance, so that fluid pressure devices which incorporate such a valve seal mechanism will be kept at a constant quality level.

A major object of the present invention is to provide a valve seal mechanism in which a ridge and holders on a seat are separated from each other by a groove which is held in communication with a port through grooves defined between the holders for thereby providing a constant sealing area to achieve a constant rate of flow of a fluid.

Another object of the present invention is to provide a pressure-reducing mechanism or a solenoid-operated valve which incorporates a valve seal mechanism and which is of a constant quality and has a long service life.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
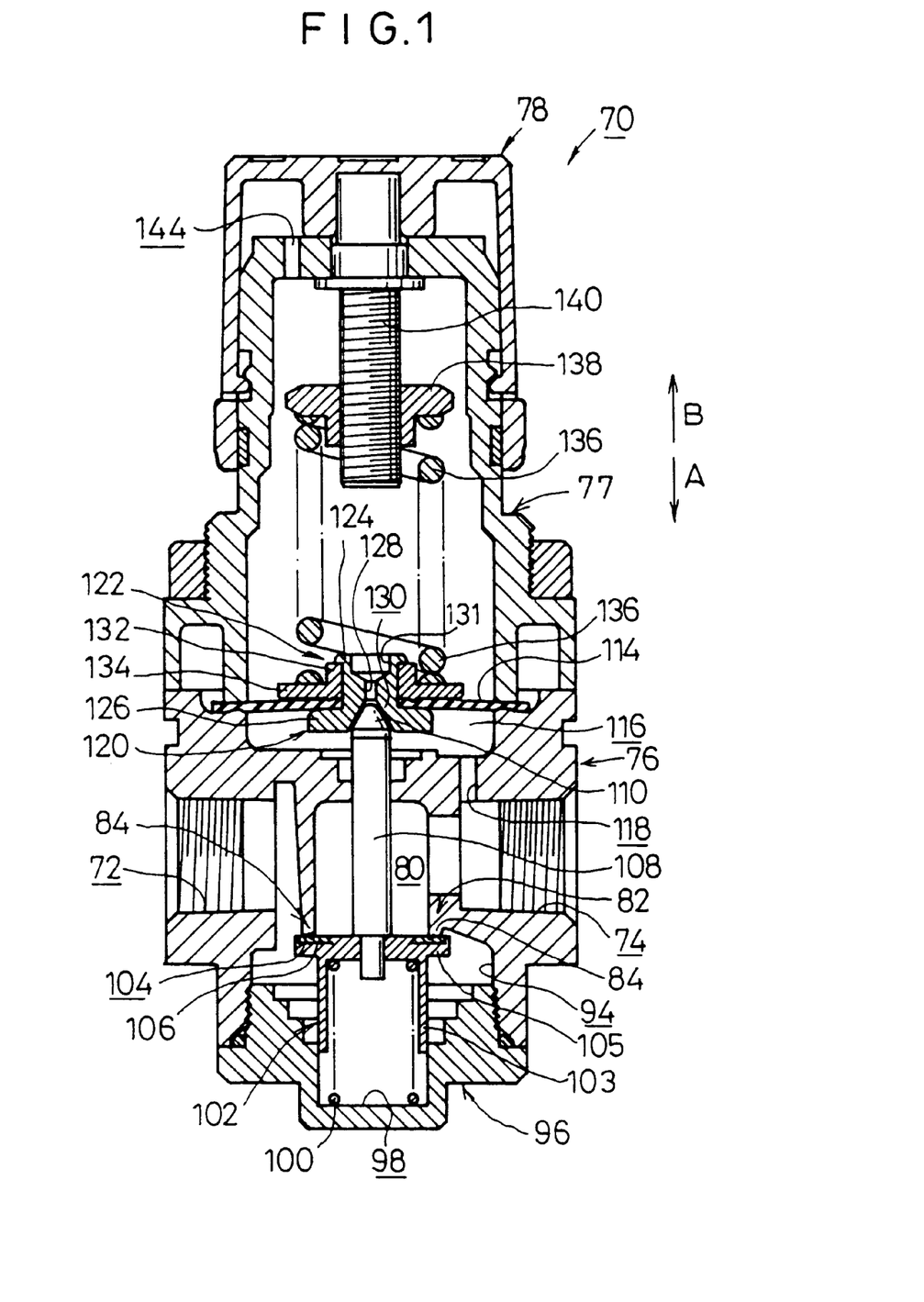
FIG. 1 is a longitudinal cross-sectional view of a pressure-reducing valve which incorporates a valve seal mechanism according to an embodiment of the present invention.

As shown in FIG. 1, a pressure-reducing valve 70 which incorporates a valve seal mechanism 82 according to an embodiment of the present invention comprises a valve housing 76 having primary and secondary ports 72, 74 defined therein, a bonnet 77 mounted on an upper end of the valve housing 76, and a handle 78 rotatably supported on an upper end of the bonnet 77.

Figure 2:
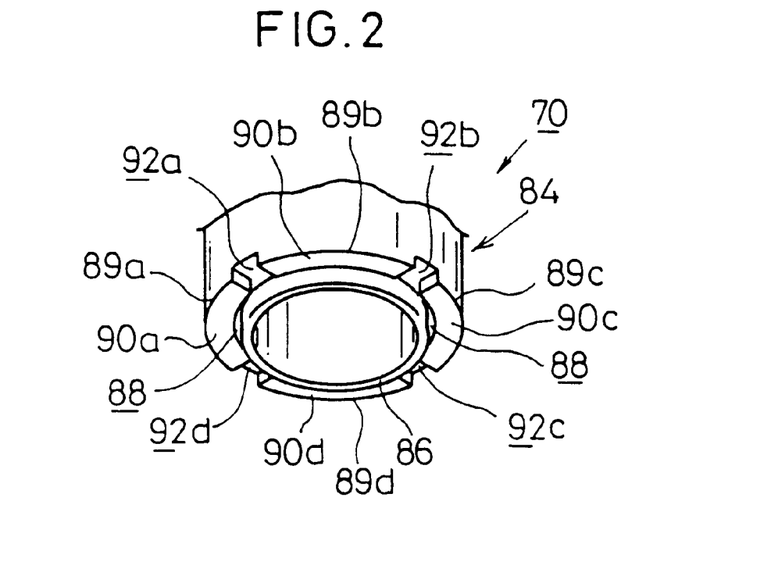
FIG. 2 is an enlarged fragmentary perspective view of a seat of the pressure-reducing valve shown in FIG. 1.
Figure 3:
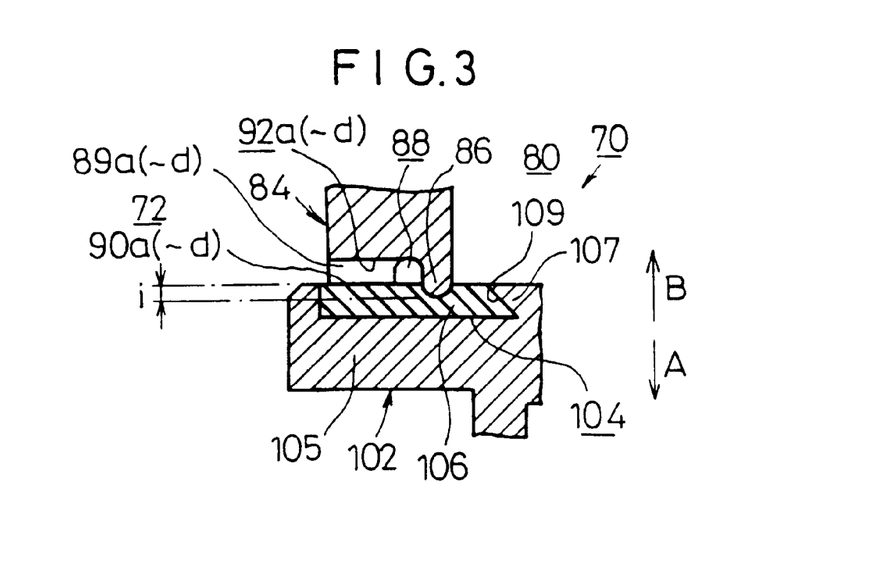
FIG. 3 is an enlarged fragmentary cross-sectional view of the valve seal mechanism in the pressure-reducing valve shown in FIG. 1.

The valve housing 76 has a chamber 80 defined therein which communicates with the secondary port 74. The chamber 80 is defined by a substantially cylindrical wall whose lower end has a seat 84 of the valve seal mechanism 82. As shown in FIGS. 2 and 3, the seat 84 has an inner annular ridge 86 whose lower tip end has a curved cross-sectional shape, an annular groove 88 surrounding the annular ridge 86, and a plurality of holders 89a–89d disposed around the annular groove 88 and angularly spaced at equal circumferential intervals. The holders 89a–89d have respective lower surfaces serving as abutment surfaces 90a–90d. The holders 89a–89d are angularly spaced by grooves 92a–92d defined therebetween. The abutment surfaces 90a–90d are also angularly spaced by the grooves 92a–92d, and are axially retracted from the ridge 86 in the direction indicated by the arrow A.

As shown in FIG. 1, the valve housing 76 has a hole 94 defined in a lower end thereof below the seat 84 and held in communication with the chamber 80. The hole 94 is defined by a cylindrical wall which is internally threaded. A valve guide 96 is threaded into the hole 94 and has a recess 98 in which a valve body 102 is slidably inserted. The valve body 102 comprises a tubular member 103 and a valve element 105 integrally formed with an upper end of the tubular member 103. A helical spring 100 has an upper end held against a lower end of the valve element 105 and a lower end seated on a lower surface of the recess 98. The valve body 102 is normally urged by the helical spring 100 to move upwardly in the direction indicated by the arrow B.

As shown in FIG. 3, an annular seal pad 106 made of an elastomeric material such as rubber is fitted in an annular slot 104 defined in an upper surface of the valve element 105. The annular slot 104 is defined by a wall 107 having a dovetail cross section, and the seal pad 106 has a slanted surface 109 engaging the wall 107. The seal pad 106 is thus retained in the annular slot 104 against removal. The seal pad 106 can be brought into and out of engagement with the seat 84. As shown in FIG. 1, a rod-shaped stem 108 has a lower end fixed centrally to the valve element 105 and an upper tapered end 110 which is progressively smaller in diameter in the upward direction.

A diaphragm 114 is clamped between the valve housing 76 and the bonnet 77, and the diaphragm 114 and a recess defined in the upper end of the valve housing 76 jointly define a diaphragm chamber 116 which communicates with the secondary port 74 through a passage 118. First and second diaphragm holders 120, 122 which hold the diaphragm 114 are mounted centrally respectively on lower and upper surface of the diaphragm 114.

The first diaphragm holder 120 which holds the lower surface of the diaphragm 114 comprises a cylindrical member 124 fitted in a central hole defined in the diaphragm 114 and projecting upwardly from the diaphragm 114, and a flange 126 extending radially outwardly from a lower end of the cylindrical member 124 and held against the lower surface of the diaphragm 114. The cylindrical member 124 has a central hole 128 defined therein by a wall which includes a downwardly spreading tapered surface 130. The hole 128 is closed when the upper tapered end 110 of the stem 108 is seated on the tapered surface 130. The wall which defines the hole 128 also includes an upwardly spreading tapered surface.

The second diaphragm holder 122 which holds the upper surface of the diaphragm 114 comprises a cylindrical member 132 having a hole in which the cylindrical member 124 is fitted, and a flange 134 extending radially outwardly from a lower end of the cylindrical member 132 and held against the upper surface of the diaphragm 114. The diaphragm 114 is sandwiched between the flanges 126, 134 of the first and second diaphragm holders 120, 122.

A pressure regulating spring 136 has a lower end seated on the flange 134 and an upper end seated on a nut 138 threaded over a screw 140 fixed centrally to the handle 78. When the handle 78 and the screw 140 are turned in unison, the nut 138 is axially displaced in the direction indicated by the arrow A or B.

A relief port 144 is defined in the upper end of the valve housing 76 for releasing a fluid out of the valve housing 76.

Figure 4:
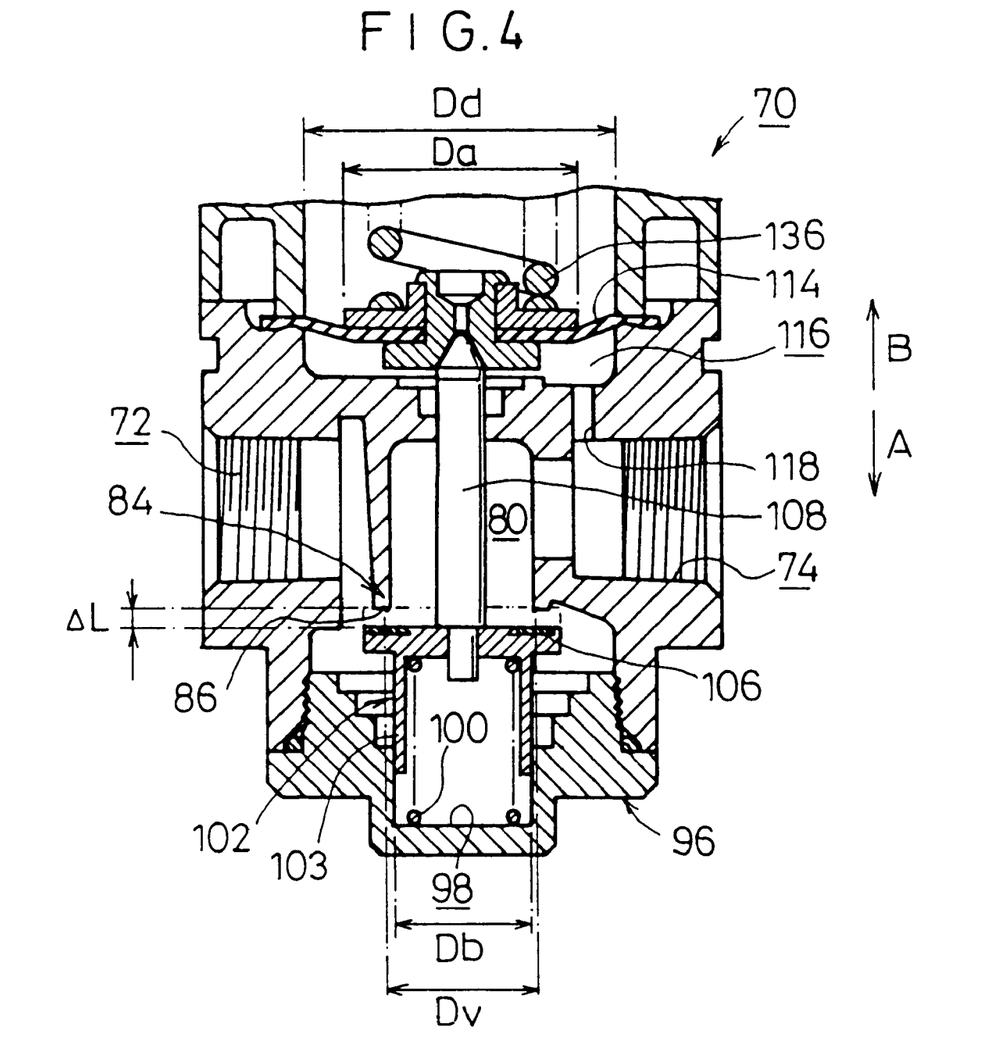
FIG. 4 is a longitudinal cross-sectional view showing the manner in which the pressure-reducing valve shown in FIG. 1 operates.

The pressure-reducing valve 70 operates as follows:

A source of compressed air (not shown) is connected to the primary port 72, and a desired fluid pressure device (not shown) such as a pneumatic cylinder is connected to the secondary port 74. The handle 78 is turned in one direction to establish a pressure of compressed air to be supplied to the fluid pressure device. Specifically, in FIG. 1, the handle 78 and the screw 140 are turned in unison to axially displace the nut 138 in the direction indicated by the arrow A, the spring 136 is compressed to press the diaphragm 114 in the direction indicated by the arrow A. The stem 108 and the valve body 102 are also displaced in the direction indicated by the arrow A until, as shown in FIG. 4, the seal pad 106 is spaced a distance from the seat 84, whereupon the primary and secondary ports 72, 74 communicate with each other.

Thereafter, the source of compressed air is actuated to introduce compressed air into the pressure-reducing valve 70 from the primary port 72. The supplied compressed air flows through the chamber 80 into the secondary port 74, from which it is supplied to the fluid pressure device. Part of the compressed air supplied to the secondary port 74 flows through the passage 118 into the diaphragm chamber 116, generating a force to press the diaphragm 114 in the direction indicated by the arrow B. The diaphragm 114 is displaced in unison with the stem 108, displacing the valve body 102 in the direction indicated by the arrow B, until the force acting on the diaphragm 114 and the bias of the spring 136 are brought into equilibrium with each other.

When the fluid pressure in the secondary port 74 builds up to a certain level, the valve body 102 is further displaced in the direction indicated by the arrow B. As shown in FIGS. 1 and 3, the seal pad 106 abuts against the seat 84 to provide a seal therebetween, cutting off the communication between the primary and secondary ports 72, 74.

Specifically, the ridge 86 on the end of the seat 84 enters and elastically deforms the seal pad 106 to cut off the communication between the primary and secondary ports 72, 74. Upon further displacement of the valve body 102 in the direction indicated by the arrow B, the abutment surfaces 90a–90d of the holders 89a–89d abut against the seal pad 106. Since the abutment surfaces 90a–90d abut against the seal pad 106 in a large area, the seal element 106 is not deformed when pressed by the abutment surfaces 90a–90d, and the ridge 86 is prevented from further entering the seal pad 106.

At this time, the ridge 86 enters the seal pad 106 by a distance i. Since the distance i depends on the accuracy with which the seat 84 is machined, the distance i does not vary greatly from seat to seat. Accordingly, even when pressure-reducing valves 70 are mass-produced, they have a substantially constant distance i.

A dynamic state of balance or equilibrium achieved between forces in the pressure-reducing valve 70 will be described below.

An area in which the pressure of the fluid is applied to the diaphragm 114, i.e., an effective pressure-bearing area Ad, is expressed by:

$$Ad = \pi \times \{(Dd+Da)/2\}^2/4 \tag{1}$$

where Dd is the inside diameter of a wall defining the diaphragm chamber 116, and Da is the outside diameter of the second diaphragm holder 122 (see FIG. 4). A valve sealing area Av is an area of the upper surface of the valve body 102 which is surrounded by the ring 86 when it is held against the seal element 106, and is represented by:

$$Av = (\pi \times Dv^2)/4 \tag{2}$$

where Dv is the diameter of the ridge. A valve sliding region sealing area Ab is an area of the lower surface of the recess 98 which is closed by the tubular member 103 of the valve body 102 which slides against the wall that defines the recess 98, and is represented by:

$$Ab = (\pi \times Db^2)/4 \tag{3}$$

where Db is the diameter of the tubular member 103.

It is assumed that the spring 136 has a spring constant Ka, the amount of flexing of the spring 136 (the distance by which the spring 136 is contracted when the nut 138 is axially displaced by the turning of the handle 78) is indicated by X, the fluid pressure in the primary port 72 is indicated by $P_1$, the fluid pressure in the secondary port 74 is indicated by $P_2$, the load on the helical spring 100 (the force applied to the helical spring 100 when the seal pad 106 is held against the seat 84) is indicated by $f_1$, the efficiency (spring constant) of a reactive force generated against the deformation of the elastomeric material of the seal element 106 is indicated by k, and the helical spring 100 has a spring constant Kv. When the fluid pressure in the secondary port 74 is $P_2$ and the primary and secondary ports 72, 74 are disconnected by the seat 84 held against the seal element 106, the force $Fa_1$ which presses the valve body 102 in the direction indicated by the arrow A is given as:

$$Fa_1 = Ka \times X + k \times i \tag{4}$$

The force $Fb_1$ which presses the valve body 102 in the direction indicated by the arrow B is given as:

$$Fb_1 = Ad \times P_2 + (P_1-P_2) \times (Av-Ab) + f_1 \tag{5}$$

Since these forces $Fa_1$, $Fb_1$ are held in equilibrium with each other, the following equation is obtained from the equations (4) and (5):

$$Ka \times X + k \times i = Ad \times P_2 + (P_1-P_2) \times (Av-Ab) + f_1 Ka \times X - Ad \times P_2 - (P_1-P_2) \times (Av-Ab) - f_1 + k \times i = 0 \tag{6}$$

When the fluid pressure in the secondary port 74 drops from the pressure $P_2$ by $\Delta P$, the fluid pressure in the diaphragm chamber 116 drops, causing the diaphragm 114 to be displaced in the direction indicated by the arrow A, and the valve body 102 is displaced by a distance $\Delta L$ (see FIG. 4). If the distance $\Delta L$ is smaller than the distance i, i.e., if the seal pad 106 and the seat 84 are held against each other, then the force $Fa_2$ which presses the valve body 102 in the direction indicated by the arrow A is given as:

$$Fa_2 = Ka \times (X-\Delta L) + k \times (i-\Delta L) \tag{7}$$

The force $Fb_2$ which presses the valve body 102 in the direction indicated by the arrow B is given as:

$$Fb_2 = Ad \times (P_2-\Delta P) + (P_1-P_2+\Delta P) \times (Av-Ab) + (f_1+Kv \times \Delta L) \tag{8}$$

Since these forces $Fa_2$, $Fb_2$ are held in equilibrium with each other, the following equation is obtained from the equations (7) and (8):

$$Ka \times (X-\Delta L) + k \times (i-\Delta L) = Ad \times (P_2-\Delta P) + (P_1-P_2+\Delta P) \times (Av-Ab) + (f_1+Kv \times \Delta L)$$

$$Ka \times (X-\Delta L) - Ad \times (P_2-\Delta P) - (P_1-P_2+\Delta P) \times (Av-Ab) - (f_1+Kv \times \Delta L) + k \times (i-\Delta L) = 0 \tag{9}$$

By subtracting the equation (9) from the equation (6), the following equation is obtained:

$$Ka \times \Delta L - Ad \times \Delta P + \Delta P \times (Av-Ab) + Kv \times \Delta L + k\Delta L = 0 \ (Ka+Kv+k) \times \Delta L - (Ad-Av+Ab) \times \Delta P = 0 \tag{10}$$

A small displacement $\Delta L$ is given by:

$$\Delta L = \{(Ad-Av+Ab)/(Ka+Kv+k)\} \times \Delta P \tag{11}$$

When $\Delta L < i$, the seat 84 and the seal pad 106 are held against each other. When $\Delta L > i$, the seat 84 and the seal pad 106 are separated from each other, connecting the primary and secondary ports 72, 74 to each other. By substituting the equation (11) in the boundary condition $\Delta L = i$, the distance i is given as follows:

$$i = \{(Ad-Av+Ab)/(Ka+Kv+k)\} \times \Delta P_0 \tag{12}$$

where $\Delta P_0$ is the reduction in the fluid pressure in the secondary port 74. The pressure reduction $\Delta P_0$ is expressed by:

$$\Delta P_0 = \{(Ka+Kv+k)/(Ad-Av+Ab)\} \times i \tag{13}$$

Therefore, when the reduction $\Delta p$ in the fluid pressure in the secondary port 74 becomes larger than the reduction $\Delta P_0$, the seat 84 and the seal pad 106 are separated from each other, introducing the fluid into the secondary port 74.

As can be understood from the equation (13), if the distance i changed, then the pressure reduction $\Delta P_0$ would also change, resulting in an error in the flow rate characteristics of the pressure-reducing valve 70. Thus, mass-produced pressure-reducing valves 70 would not have a constant quality level. According to the present invention, however, since the distance i does not change, the pressure reduction $\Delta P_0$ is constant, and the flow rate of the fluid in the pressure-reducing valve 70 is constant. As a result, mass-produced pressure-reducing valves 70 have a constant quality level.

The groove 88 communicate with the primary port 72 through the grooves 92a–92d when the abutment surfaces 90a–90b are held against the seal pad 106. Therefore, the abutment surfaces 90a–90b do not provide a seal, but only the ridge 86 provides a seal. Regardless of whether the abutment surfaces 90a–90b are held against the seal pad 106 or not, the valve sealing area Av expressed by the equation (2) is constant, preventing the reduction $\Delta P_0$ in the fluid pressure in the secondary port 74 from changing (see the equation (13)). Accordingly, there is no danger for the flow rate characteristics of the pressure-reducing valve 70 to change. When pressure-reducing valves 70 are mass-produced, they are prevented from having different flow rate characteristics, and they have a constant quality level. Fluid pressure systems which incorporate those mass-produced pressure-reducing valves 70 also have a constant quality level.

Furthermore, since the lower tip end of the annular ridge 86 has a curved cross-sectional shape, the ridge 86 does not damage the seal pad 106 when the ridge 86 enters the seal pad 106. Therefore, the pressure-reducing valve 70 has a long service life.

The valve seal mechanism 82 is not limited to use in the pressure-reducing valve 70, but may be incorporated in any of various fluid pressure devices for improved flow rate characteristics.

Figure 5:
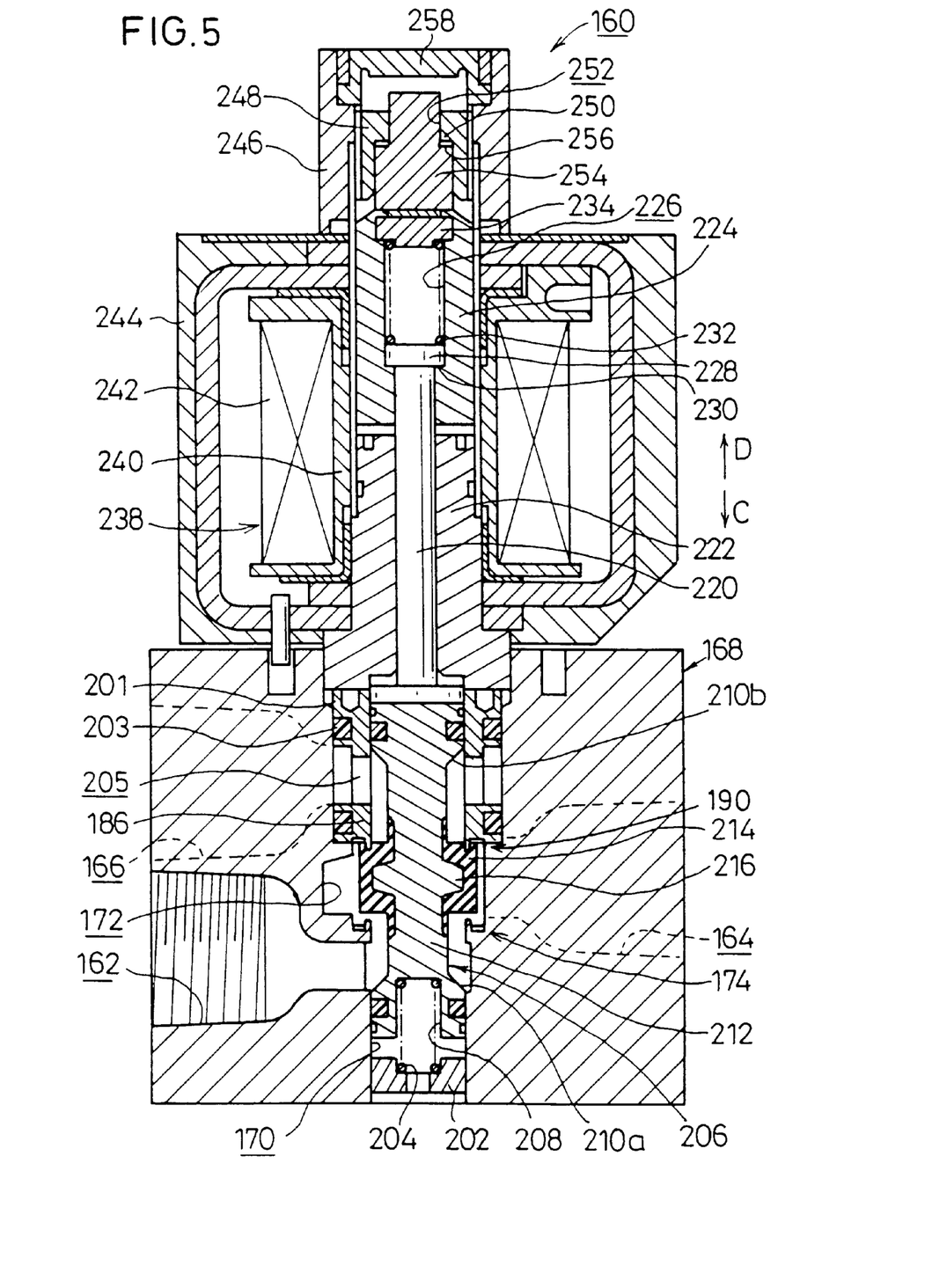
FIG. 5 is a longitudinal cross-sectional view of a solenoid-operated valve which incorporates a valve seal mechanism according to another embodiment of the present invention.
Figure 6:
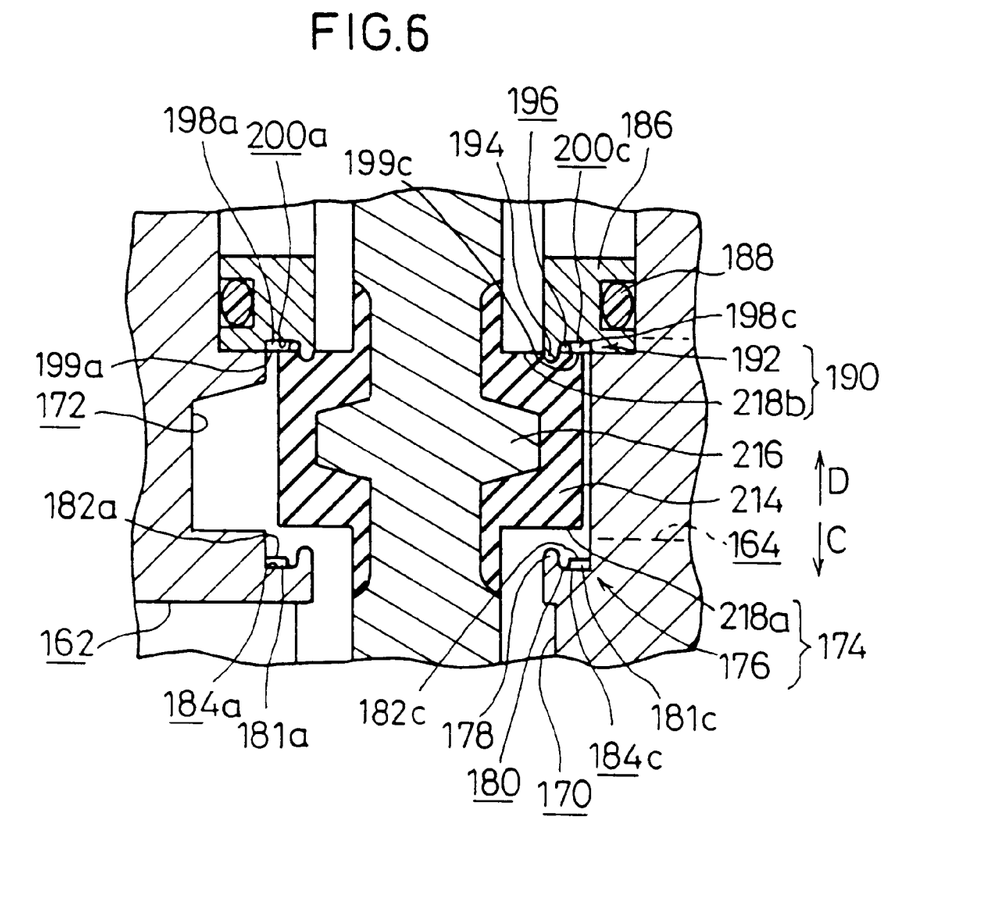
FIG. 6 is an enlarged fragmentary cross-sectional view of the valve seal mechanism in the solenoid-operated valve shown in FIG. 5.

FIGS. 5 and 6 show a solenoid-operated valve 160 which incorporates a valve seal mechanism according to another embodiment of the present invention. As shown in FIG. 5, the solenoid-operated valve 160 comprises a valve housing 168 having a first port 162, a second port 164, and a third port 166. The valve housing 168 also has a central hole 170 communicating with the first port 162, the second port 164, and the third port 166. A seat 202 is fixedly disposed in a lower open end of the hole 170.

The hole 170 is defined by a wall having a groove 172 communicating with the second port 164 and a seat 176 (see FIG. 6) of a valve seal mechanism 174 near the groove 172. The seat 176 has an annular ridge 178 whose upper end has a curved cross-sectional shape and a groove 180 defined around the ridge 178. The seat 176 also has a plurality of holders 181a–181d (181b, 181d not shown) disposed around the groove 180 and having respective upper abutment surfaces 182a–182d (182b, 182d not shown) thereon. The abutment surfaces 182a–182d are spaced by grooves 184a–184d (184b, 184d not shown) defined between the holders 181a–181d.

A ring 186 is fixed to the wall defining the hole 170 above the groove 172, and an O-ring 188 is disposed around the ring 186. A valve seal mechanism 190 has a seat 192 on a lower surface of the ring 186. The seat 192 has an annular ridge 194 whose lower end has a curved cross-sectional shape and a groove 196 defined around the ridge 194. The seat 192 also has a plurality of holders 198a–198d (198b, 198d not shown) disposed around the groove 196 and having respective lower abutment surfaces 199a–199d (199b, 199d not shown) thereon. The abutment surfaces 199a–199d are spaced by grooves 200a–200d (200b, 200d not shown) defined between the holders 198a–198d.

As shown in FIG. 5, a ring 201 is fixed to the wall defining the hole 170 near an upper open end of the hole 170, and an O-ring 203 is disposed around the ring 201. A groove 205 is defined in the wall defining the hole 170 between the rings 186, 201 and held in communication with the third port 166.

A substantially cylindrical valve body 206 is axially slidably disposed in the hole 170. The valve body 206 has a recess 208 defined in a lower end thereof. A helical spring 204 has an upper end seated on an upper end of the recess 208 and a lower end seated on the seat 202. Therefore, the valve body 206 is normally urged by the helical spring 204 to move in the direction indicated by the arrow D. The valve body 206 has a pair of axially spaced tapered surfaces 210a, 210b progressively smaller in diameter longitudinally centrally into a constricted portion 212. The constricted portion 212 has a radially outward land 216 which is covered with a seal sleeve 214 (see FIG. 6) made of an elastomeric material such as rubber. The seal sleeve 214 is snugly fitted over the constricted portion 212. The seal sleeve 214 has seal surfaces 218a, 218b of the valve seal mechanisms 174, 190, which can be held against the seats 176, 192, respectively.

A rod 220 has a lower end fixed to an upper end of the valve body 206 and is slidably inserted in a substantially cylindrical guide 222 that is fixed to an upper end of the ring 201. The rod 220 has an upper end inserted in a hole 226 defined in a displacement member 224. A flange 228 on the upper end of the rod 220 engaging a step 230 on a wall that defines the hole 226, preventing the rod 220 from being dislodged from the displacement member 224. A helical spring 232 has a lower end seated on the flange 228 and an upper end seated on a seat 234 fixed to an upper portion of the wall that defines the hole 226. The rod 220 is thus normally urged by the helical spring 232 to move in the direction indicated by the arrow C.

The displacement member 224 is axially slidably disposed in a bobbin 240 of a solenoid coil 238. The bobbin 240 supports a winding 242 of electric wire. The solenoid coil 238 is covered with a casing 244 that supports on its upper end a tubular member 246 in which the guide 248 fixedly mounted. The guide 248 has a hole 252 defined centrally therein and having a step 250. A pin 254 fixedly mounted on an upper surface of the seat 234 is inserted in the hole 252. The pin 254 has a step 256 engageable with the step 250 of the guide 248. An upper open end of the tubular member 246 is closed by a cap 258.

The solenoid-operated valve 160 with the valve seal mechanisms 174, 190 operates as follows:

Fluid pressure devices (not shown) including a source of compressed air, a cylinder, and an exhaust pipe are connected respectively to the first, second, and third ports 162, 164, 166. An electric power supply (not shown) is connected to the winding 242 of the solenoid coil 238.

When the solenoid coil 238 is not energized by the electric power supply, the valve body 206 is axially displaced in the direction indicated by the arrow D under the bias of the helical spring 204. The ridge 194 of the valve seal mechanism 190 enters the seal surface 218b of the seal sleeve 214, providing a seal, as shown in FIG. 6. The first and second ports 162, 164 are brought into communication with each other through the groove 172, and the second and third ports 164, 166 are disconnected from each other. Compressed air is supplied from the source of compressed air connected to the first port 162 is supplied through the first and second ports 162, 164 to the cylinder connected to the second port 164.

At this time, the abutment surfaces 199a–199d of the holders 198a–198d are held against the seal surface 218b, preventing the ridge 194 from entering the seal surface 218b beyond a certain distance. Thus, the seal surface 218b is prevented from being unduly deformed by the ridge 194, and hence the seal sleeve 214 is prevented from being undesirably damaged or deteriorated.

When the solenoid coil 238 is energized by the electric power supply, the displacement member 224 is axially displaced in the direction indicated by the arrow C, causing the rod 220 guided by the guide 222 to displace the valve body 206 against the bias of the helical spring 204 (see FIG. 5). The seal surface 218a of the valve seal mechanism 174 contacts the ridge 178, which enters the seal surface 218a upon continued displacement of the valve body 206, providing a seal. As a result, the first and second ports 162, 164 are disconnected, and the second and third ports 164, 166 are brought into communication with each other. Therefore, compressed air is discharged from the cylinder and flows through the second and third ports 164, 166 into the exhaust pipe connected to the third port 166.

At this time, the abutment surfaces 182a–182d of the holders 181a–181d are held against the seal surface 218a, preventing the ridge 178 from entering the seal surface 218a beyond a certain distance. Thus, the seal surface 218a is prevented from being unduly deformed by the ridge 178, and hence the seal sleeve 214 is prevented from being undesirably damaged or deteriorated.

Because the seal sleeve 214 is subject to minimum damage or deterioration due to entry of the ridges 178, 194 thereinto, the solenoid-operated valve 160 has a relatively long service life.

Although certain preferred embodiments of the present invention have been shown and described in detail, it should be understood that various changes and modifications may be made therein without departing from the scope of the appended claims.

What is claimed is:

1. A valve seal mechanism comprising:
   a seat;
   a seal member made of an elastomeric material, said seat and said seal member being displaceable relatively to each other into abutment against each other to disconnect a port from another port;
   said seat having a ridge for pressing and elastically deforming said seal member to provide a seal therebetween, and a plurality of holders engageable with said seal member and having respective abutment surfaces which are positioned for abutment contact against said seal member;
   said abutment surfaces being retracted from said ridge relative to said seal member;
   the arrangement being such that when said seat is displaced relatively toward said seal member, said ridge enters said seal member to provide a seal therebetween, and is prevented from further entering said seal member by said abutment surfaces which are held against said seal member upon continued displacement of said seat.

2. A valve seal mechanism according to claim 1, wherein said seat has a groove defined between said ridge and said holders, said ridge and said holders being spaced from each other by said groove, and a plurality of grooves defined between said holders, the arrangement being such that when holders are held against said seal member, said groove communicates with said port or said other port through said grooves.

3. A valve seal mechanism according to claim 1, wherein said ridge has a tip end having a curved cross-sectional shape.

4. A valve seal mechanism according to claim 1, combined with a pressure-reducing valve having a primary port as said port and a secondary port as said other port, for selectively connecting said primary port and said secondary port to each other and disconnecting said primary port and said secondary port from each other.

5. A valve seal mechanism according to claim 4, wherein said pressure-reducing valve comprises a valve body having said seal member and a diaphragm displaceable for displacing said valve body, the arrangement being such that when said diaphragm is displaced, said valve body is displaced to selectively connect said primary port and said secondary port to each other and disconnect said primary port and said secondary port from each other.

6. A valve seal mechanism according to claim 1, combined with a solenoid-operated valve having a plurality of ports as said port and said other port, for selectively connecting selected ones of said ports to each other and disconnecting selected ones said ports from each other.

7. A valve seal mechanism according to claim 6, said solenoid-operated valve comprises a valve body having said seal member and a solenoid coil energizable for displacing said valve body, the arrangement being such that when said solenoid coil is energized, said valve body is displaced to selectively connect selected ones of said ports to each other and disconnect selected ones of said ports from each other.

8. A valve seal mechanism comprising:
   a seat;
   a seal member made of an elastomeric material, said seat and said seal member being displaceable relatively to each other into abutment against each other to disconnect a port from another port;
   said seat having a ridge for pressing an elastically deforming said seal member to provide a seal therebetween, and a plurality of holders engageable with said seal member and having respective abutment surfaces;
   said abutment surfaces being retracted from said ridge relative to said seal member;
   the arrangement being such that when said seat is displaced relatively toward said seal member, said ridge enters said seal member to provide a seal therebetween, and is prevented from further entering said seal member by said abutment surfaces which are held against said seal member upon continued displacement of said seat,
   wherein said seat further comprises a first groove defined between said ridge and said holders, said ridge and said holders being spaced from each other by said groove, and a plurality of second grooves defined between said holders, the arrangement being such that when said holders are held against said seal member, said first groove communicates with said port or said other port through said second grooves.

9. A valve seal mechanism comprising:
   a seat;
   a seal member made of an elastomeric material, said seat and said seal member being displaceable relatively to each other into abutment against each other to disconnect a port from another port;
   said seat having a ridge for pressing and elastically deforming said seal member to provide a seal therebetween, and a plurality of holders engageable with said seal member and having respective abutment surfaces;

said abutment surfaces being retracted from said ridge in a direction toward said seal member;

the arrangement being such that when said seat is displaced relatively toward said seal member, said ridge enters said seal member to provide a seal therebetween, and is prevented from further entering said seal member by said abutment surfaces which are held against said seal member upon continued displacement of said seat, said seal mechanism being combined with a pressure reducing valve having a primary port as said port and a secondary port as said other port, for selectively connecting said primary port and said secondary port to each other and disconnecting said primary port and said second port from each other.

10. The valve seal mechanism according to claim 9, wherein said pressure-reducing valve comprises a valve body having said seal member and a diaphragm displaceable for displacing said valve body, the arrangement being such that when said diaphragm is displaced, said valve body is displaced to selectively connect said primary port and said secondary port to each other and disconnected said primary port and said secondary port from each other.

* * * * *